United States Patent
Schuldt

(10) Patent No.: US 8,414,321 B2
(45) Date of Patent: Apr. 9, 2013

(54) POWER ELEMENT FOR A MOTOR OF AN INDUSTRIAL TRUCK

(75) Inventor: Thomas Schuldt, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 315 days.

(21) Appl. No.: 12/830,864

(22) Filed: Jul. 6, 2010

(65) Prior Publication Data

US 2011/0007484 A1  Jan. 13, 2011

(30) Foreign Application Priority Data

Jul. 8, 2009 (DE) .......................... 10 2009 032 103

(51) Int. Cl.
*H01R 13/64* (2006.01)
*H05K 7/02* (2006.01)
*H05K 7/04* (2006.01)

(52) U.S. Cl.
USPC .......................................... 439/246; 361/807

(58) Field of Classification Search .................. 439/246, 439/66, 63, 581–585, 486
See application file for complete search history.

(56) References Cited

U.S. PATENT DOCUMENTS

| | | | |
|---|---|---|---|
| 2,086,424 A | | 7/1937 | Koehler |
| 5,572,109 A * | | 11/1996 | Keith .............................. 320/109 |
| 5,931,682 A * | | 8/1999 | Takiguchi et al. .............. 439/34 |
| 6,695,632 B2 * | | 2/2004 | Matsumoto et al. ........... 439/246 |
| 6,948,963 B2 * | | 9/2005 | Burton ............................ 439/246 |
| 7,018,216 B1 | | 3/2006 | Clark et al. |
| 7,227,334 B2 * | | 6/2007 | Yang et al. ..................... 320/107 |
| 7,367,831 B2 * | | 5/2008 | Starta et al. .................... 439/246 |
| 7,442,045 B1 | | 10/2008 | Di Stefano |
| 2002/0127909 A1 * | | 9/2002 | Pradier et al. ................. 439/573 |
| 2002/0192992 A1 * | | 12/2002 | Eckel et al. .................... 439/246 |
| 2004/0229490 A1 | | 11/2004 | Bernat et al. |
| 2004/0235328 A1 * | | 11/2004 | Maegawa et al. ............. 439/246 |
| 2007/0173096 A1 * | | 7/2007 | Hayashi ......................... 439/246 |
| 2008/0054701 A1 * | | 3/2008 | Yoshida et al. ................ 297/410 |
| 2008/0261428 A1 * | | 10/2008 | Brodeur ......................... 439/246 |
| 2008/0318458 A1 * | | 12/2008 | Hiramatsu ..................... 439/246 |
| 2009/0093148 A1 * | | 4/2009 | Petzl et al. ..................... 439/246 |
| 2009/0124105 A1 * | | 5/2009 | Lindsay ......................... 439/246 |

FOREIGN PATENT DOCUMENTS

| | | |
|---|---|---|
| DE | 1996083 U | 11/1968 |
| DE | 4225358 A1 | 2/1994 |
| DE | 102007003636 A1 | 7/2008 |
| DE | 102009020984 A1 | 11/2009 |
| EP | 0069212 A1 | 12/1983 |

(Continued)

*Primary Examiner* — Lisa Lea Edmonds
*Assistant Examiner* — Xanthia C Cunningham
(74) *Attorney, Agent, or Firm* — Vidas, Arrett & Steinkraus

(57) ABSTRACT

A power element for a motor of an industrial truck having a housing, and at least one circuit board, which has power and control components for the motor, and power terminals for the power supply line, which is led through a wall of the housing and is bonded to the circuit board, wherein the power terminals have a first connection part led through the wall with a first contact section lying within the housing, a second contact part in contact with the circuit board and with a second contact section, which is aligned to the first contact section and is distanced from it, and a radially elastic sleeve, composed of conducting material, that surrounds the two contact sections in a clamping manner, wherein the outer contour of the contact sections and the sleeve is formed such that a mechanical contact of the contact sections to the sleeve is maintained.

21 Claims, 5 Drawing Sheets

FOREIGN PATENT DOCUMENTS

| | | |
|---|---|---|
| EP | 1120861 A2 | 1/2001 |
| EP | 1434313 A1 | 6/2004 |
| EP | 1705751 A1 | 9/2006 |
| WO | 00/52788 | 9/2000 |

* cited by examiner

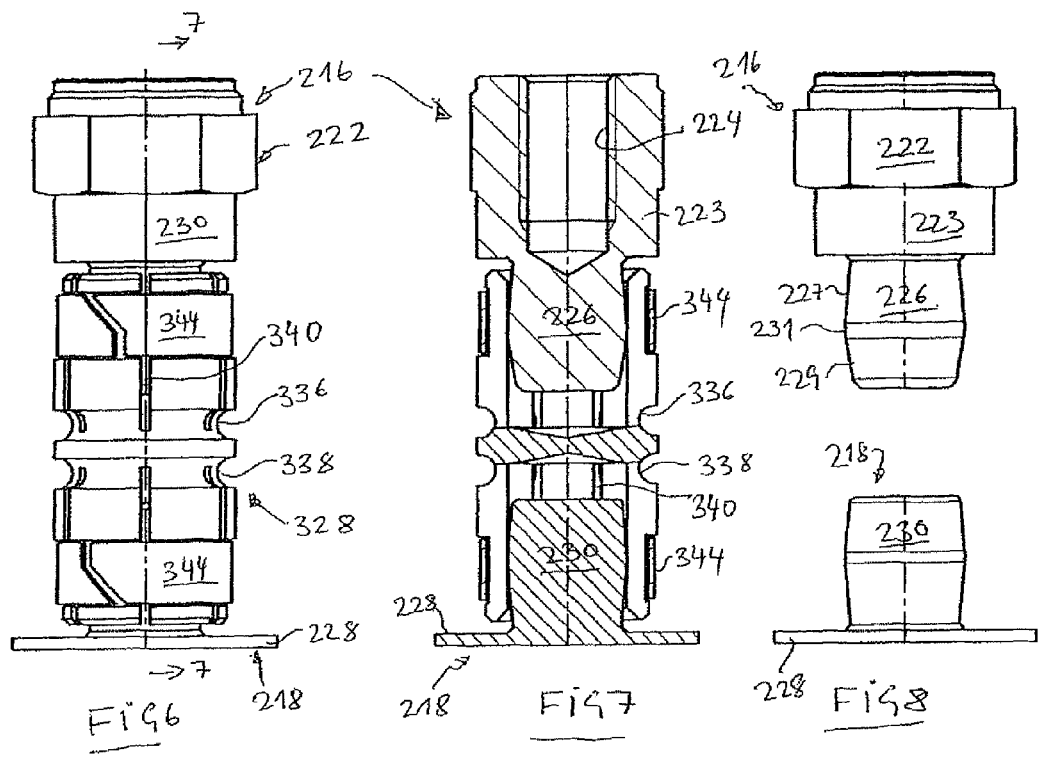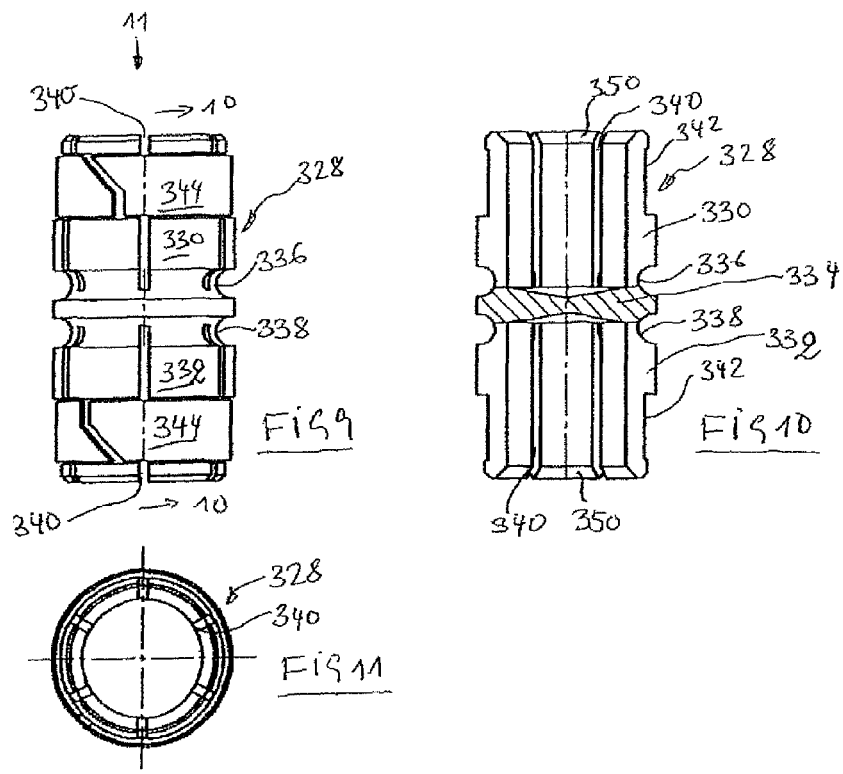

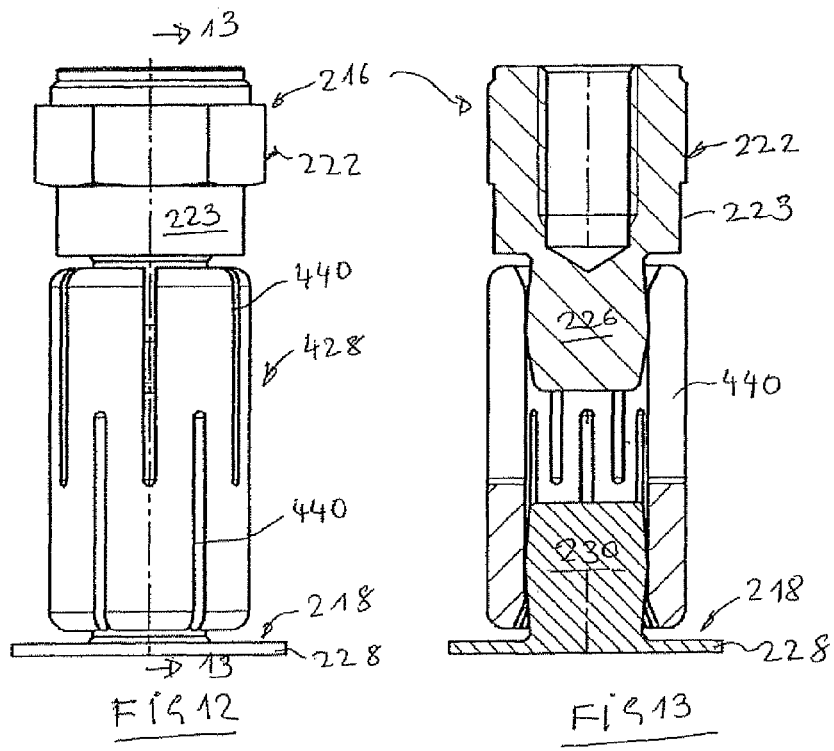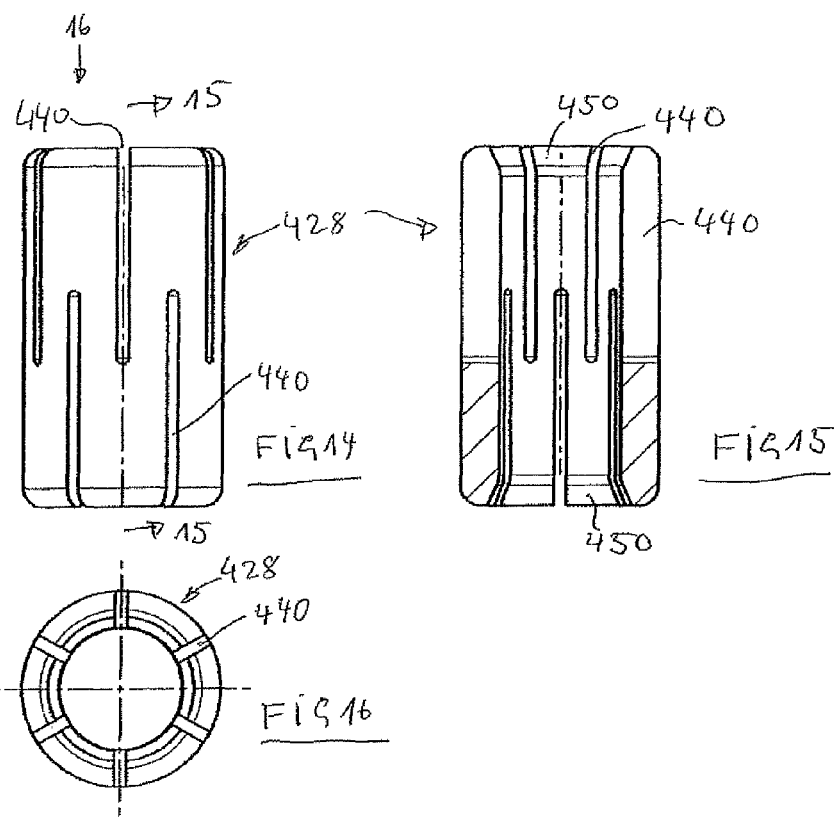

POWER ELEMENT FOR A MOTOR OF AN INDUSTRIAL TRUCK

CROSS-REFERENCE TO RELATED APPLICATIONS

Not applicable

STATEMENT REGARDING FEDERALLY SPONSORED RESEARCH

Not applicable

BACKGROUND OF THE INVENTION

The invention relates to a power element for a motor of an industrial truck.

So-called power elements are used for supplying motors driven by alternating or three-phase current from a battery for industrial trucks. These consist of power semiconductors that are controlled accordingly by a control element. The power semiconductors as well as the control semiconductor and other components are accommodated on circuit boards. For power elements, it is known to house the circuit boards for the power element and the control element in a suitable housing, and to mount the housing at a suitable location on the industrial truck. The cables are led to the housing, and a suitable feed through is provided through the housing wall in order to produce a contact to the corresponding circuit board. Conventionally such connections are mechanically connected to the housing and circuit board by screwing and by press fitting in the circuit boards. In order to permit the simplest possible feed through in the housing, the housing as well as the circuit board with the connectors must be produced very precisely to permit a secure and waterproof assembly. During the creation of the connections, assembly and operating forces are transferred directly onto the circuit board located inside.

BRIEF SUMMARY OF THE INVENTION

An object of the invention is to create a power element for a motor of an industrial truck in which the power supply line to the circuit board is force decoupled.

With the power element according to the invention, the power terminals have a first connection part led through the wall with a first contact section lying within the housing. A second connection part within the housing has a second contact section that is bonded to the circuit board, for example by press fitting, soldering or similar. The first and second contact sections are aligned to each other but are distanced from each other. A radially elastic expandable sleeve composed of a conducting material surrounds both contact sections in a clamping manner, wherein the outer contour of the contact sections and the sleeve are formed such that a mechanical contact of the contact sections to the sleeve is maintained even if the contact sections are misaligned to each other.

With the invention, an angular offset, as well as an axially parallel offset, between the two contact sections is possible. A precise assembly of the circuit board and the precise construction of the circuit board relative to the opening in the housing are therefore no longer necessary. External forces or torques are absorbed by the housing wall and cannot have any damaging influence on the inner contact section.

Different construction possibilities are conceivable for the design of the individual parts of the power terminals. According to a preferred design of the invention, the outer contour of at least one of the contact sections is barrel shaped. The sleeve can have a cylindrical interior, or can have a polygonal cross-section. According to a further design of the invention, at least one contact section is formed by a double cone with a common base plane, wherein the casing surfaces have a rounded transition. Therefore, the contact section has two conical casing surfaces, wherein the larger diameter lies at the transition between the casing surfaces. The cone angle can be relatively small, for example, 5° to 8°. A rounded transition is provided between the casing sections. The inner diameter of the sleeve is somewhat smaller than the maximum outer diameter of the double cone.

The sleeve surrounding the contact sections in a clamping manner is preferably slit (divided) in the longitudinal direction. It can also be formed undivided with several slits that permit a radial expansion of the sleeve.

According to a further design of the invention, the sleeve is preferably formed as one-piece. It can however be composed from several pieces.

According to a further design of the invention, the sleeve is divided in the center by a transverse wall, and the axially parallel slits extend nearly up to the transverse wall. This way, a double sleeve is attained wherein each sleeve section is assigned a contact section. In addition, according to a further design of the invention, the wall of the sleeve is weakened by outer annular grooves on both sides of the transverse wall. Thereby, the outer wall sections formed by the slits attain improved flexibility. Finally, in connection with this it is proposed that the sleeve near the free end has an outer annular shaped receiving groove that receives an annular spring. The annular spring preferably formed from flat material increases the clamping engagement between the sleeve and contact section.

According to a further design of the invention, the first connection part has a connection section that is fixed in the housing wall. This can be formed, for example, cylindrically and as one-piece with the first contact section. Alternatively, the connection section can have a hexagonal shape that is fixed in the housing wall.

If the housing wall is formed from plastic no special insulation is required for the connection section. In this case, according to one design of the invention, it can also be expedient if the housing wall is injection molded to the connection part. On the other hand, if the housing is produced from sheet metal, suitable insulation must be provided between the connection part and the wall of the hole.

For the bonding to the circuit board a further design of the invention provides that the second contact section is connected to a disc shaped section for the purpose of contacting the circuit board. The disc shaped section is preferably formed as one-piece with the second contact section.

According to a further design of the invention, for the connection of the contact sections, the sleeve is provided with an inner diameter that is less than the outer diameter of the cone or barrel shaped contact section. The sleeve is further provided with axially parallel slits that start from its ends and are uniformly distanced in the circumferential direction. The slits can either lie offset to each other or also aligned to each other. In the first case, according to a further design of the invention, the length of the slits is approximately ⅔ of the entire length of the sleeve. According to a further design of the invention, in another alignment of the slits to each other, their length amounts to approximately ⅜ of the length of the sleeve. In particular, with the slits assigned to the ends of the sleeve aligned to each other, it is advantageous if the thickness of the wall of the sleeve in the central region is greater than the thickness at the ends. Thereby the contact ends become thinner and permit a high flexibility of the contact springs formed in this manner. Overall, the design with the slits attains a sleeve that is changeable in diameter without plastic deformation. The contact force and insertion force can be adjusted by the length of the slits. The sleeve is preferably circularly cylindrical, but can also have a polygonal cross section.

BRIEF DESCRIPTION OF THE SEVERAL VIEWS OF THE DRAWINGS

An exemplary embodiment of the invention is explained in the following in more detail using a drawing.

FIG. 6 shows another embodiment of a power terminal for a power element;

FIG. 7 shows a section through the representation according to FIG. 6 along the line 7-7;

FIG. 8 shows a side view of the two connection parts for the power terminal according to the FIGS. 6 and 7;

FIG. 9 shows a side view of the sleeve of the power terminal according to FIG. 6;

FIG. 10 shows a section through the representation according to FIG. 9 along the line 10-10;

FIG. 11 shows the top view of the sleeve according to FIG. 9 along the arrow 11;

FIG. 12 shows a side view of a further embodiment of a power terminal according to the invention;

FIG. 13 shows a section through the representation according to FIG. 12 along the line 13-13;

FIG. 14 shows a side view of the sleeve of the power terminal according to FIG. 12;

FIG. 15 shows a section through the representation according to FIG. 14 along the line 15-15; and FIG. 16 shows the top view of the representation according to FIG. 15 along the arrow 16.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
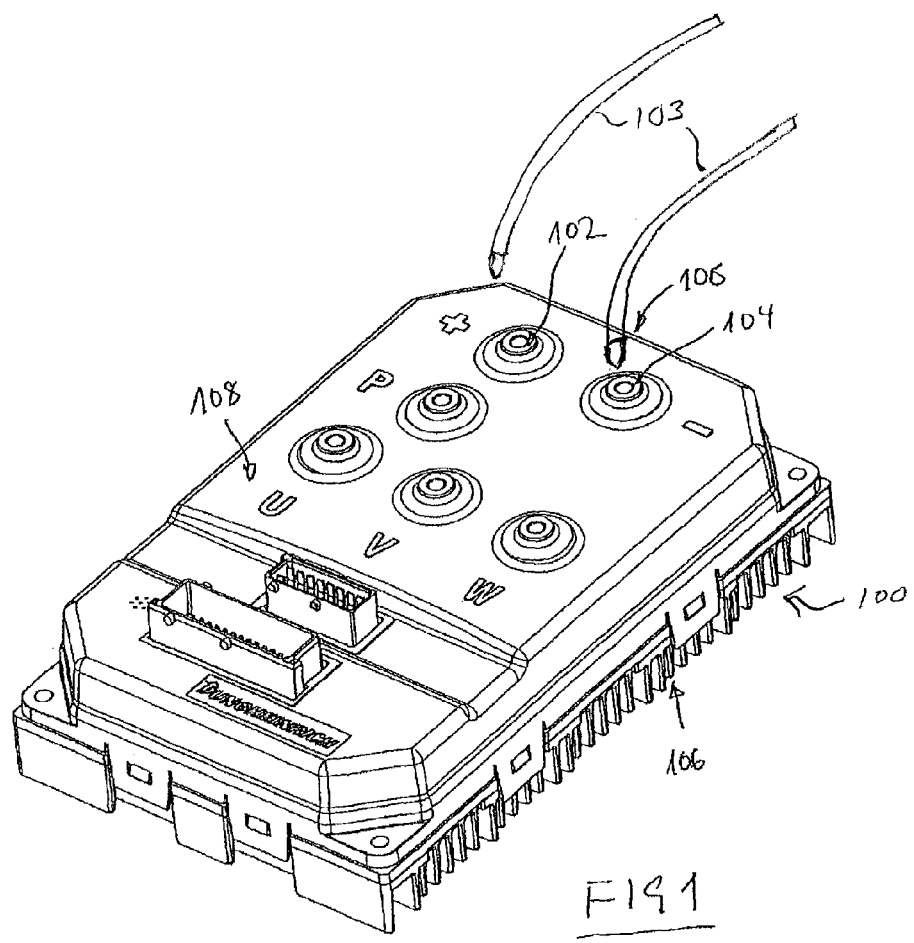
FIG. 1 shows a perspective representation of a power element for a battery driven industrial truck with power terminals according to the invention.

In FIG. 1, a power element 100 is shown in perspective as is used, for instance, for a battery driven industrial truck, for example, for supplying a travel drive or other electrical drives. The industrial truck is not represented here. It can be of any design. The power element 100 converts direct current into three-phase current. The power terminals 102 and 104 serve for connecting the power element 100 to a battery, not shown. The three-phase current connections are labeled U, V and W. The neutral output is labeled P. All power terminals have a similar, or the same, construction such as that represented in FIG. 2 or 3. The power supply line consists of cables 103 connected to the power terminals, wherein the cables 103 for the battery are led to the power terminals 102 and 104, and the cables from the power terminals U, V, W and P are led to the power consumer.

In FIG. 1, a heat sink 106 can be recognized upon which a housing cover 108 is placed. The power terminals are installed in the housing cover 108. A circuit board, to which the power terminals are connected, is located on the heat sink and within the housing cover 108. All necessary circuit components and components that are required for supplying the power consumer from the battery of the industrial truck are installed on the circuit boards. Such circuit boards are also generally known and are not described in further detail.

Figure 2:
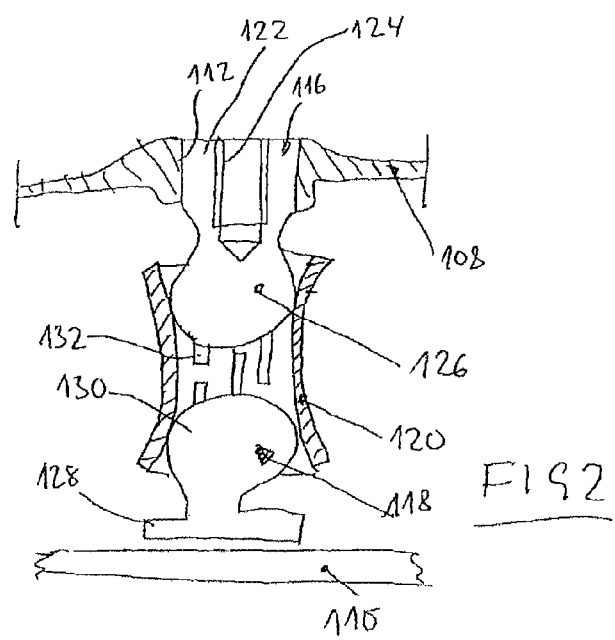
FIG. 2 shows a schematic representation of a section through the power element according to FIG. 1 in the area of one of the power terminals.

In FIG. 2, a circuit board 110 is indicated, and in addition, a part of the housing cover 108 can be recognized in section. In the opening 112 of the housing cover 108, a first connection part 116 is installed, for example, through adhering, press fitting, or another manner. The connection part 116 must be electrically connected to the second connection part 118 so that there is electrical contact to the circuit board 110. This occurs with the aid of a sleeve 120 that is described below in more detail.

The connection part 116 has a cylindrical connection section 122 in which an axial threaded bore 124 is formed. Therefore, a cable can be connected to the connection section 122 using a screw, which however, is not shown here. In addition, the connection part 116 has a spherical section 126. The connection part 118 has a disc shaped section 128, which is bonded to the circuit board 110. It also has a spherical section 130. The spherical sections 126, 130 are distanced from each other. They are both located within the sleeve 120 that is somewhat constricted in the central region. The spherical sections 126, 130 are pressed into the sleeve 120 by a certain amount so that an electrical connection can occur. It should be mentioned that, naturally, the connection parts 116, 118 and the sleeve 120 are composed of a suitable electrically conducting material, in particular metal or metal alloy.

In order for the sleeve 120 to be sufficiently elastic for clamping the spherical sections 126, 130, it is formed with axially parallel slits 132.

In the representation in FIG. 2, the connection parts 116, 118 are axially aligned to each other. However, even when this is not the case, for example, when the connection part 116 is offset relative to the lower one, or has an angular offset, it is captured by the spherical sections 126, 130 and the sleeve 120. With this, a flawless transfer of electrical energy is guaranteed even in the case of large tolerances.

Figure 3:
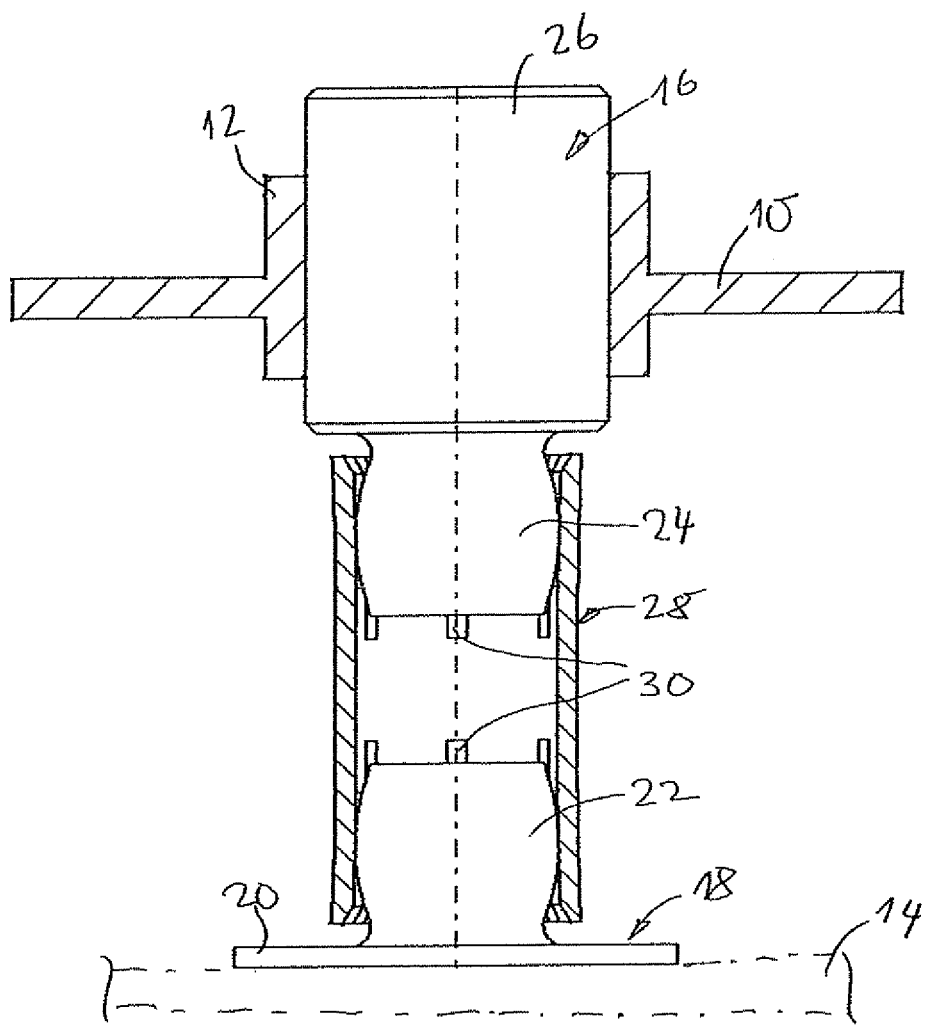
FIG. 3 shows a connection similar to FIG. 2.

FIG. 3 shows a part 10 of a wall of a housing that is not shown further, for example, of a power element according to FIG. 1 for a motor of an industrial truck (not shown). The wall 10 has a tube socket section 12 that is formed as one-piece with the wall 10, for example, of plastic. The socket section 12 can however also be composed of electrically insulating material that is installed in a suitable opening in the wall 10. A circuit board 14 (indicated by the dot-dashed line) is located within the housing. The circuit board contains all components that are necessary based on semiconductors for a power supply of a motor. The individual components are not named here because they are commonly known.

In addition, in FIG. 3 a first connection part 16 and a second connection part 18 can be seen. The second connection part 18 has a disc shaped section 20 which is mechanically and electrically connected to the circuit board 14 in a suitable manner. For example, the disc shaped section 20 is soldered onto the circuit board 14.

The disc shaped section 20 is formed as one-piece with a contact section 22 that has a barrel shaped outer contour.

The first connection part 16 has a contact section 24 that is aligned with the contact section 22, and also has a barrel shaped outer contour. The contact sections 22, 24 are distanced from each other.

The contact section 24 is connected as one-piece to a cylindrical connection section 26 that extends through the socket section outwards. It has means for connection to a cable, for example a cable lug that is fastened to the connection section 26 using a screw, wherein this can have an axially threaded bore for clamping the cable lug (not shown).

A cylindrical sleeve 28 composed of an electrically conducting material, for example of a suitable metal, surrounds both contact sections 22, 24 in a clamping manner. In order to attach the sleeve 28 in a clamping manner it is provided for example with a continuous longitudinal slit. Alternatively, as a closed sleeve, it can be provided with a plurality of axially parallel slits in order to provide a certain radial elasticity. In the figure, slits indicated with 30 that are aligned axially to each other. Their length amounts to, for example, ⅜ of the entire length of the sleeve 28.

The sleeve can also have a polygonal cross-section, and furthermore can have concavities on the inner side that nestle more or less to the barrel shaped outer contour of the contact sections 22, 24.

As can be seen through the formation of the power terminals shown, a misalignment of the contact sections 22, 24 in both the axial as well is in the angular direction is possible without negatively impacting the power transmission. Therefore, it is not necessary to align the contact sections 22, 24 exactly to each other. Therefore, an installation of the contact section 22 on the circuit board 14 that is not exact relative to the opening of the housing is not critical. Further, it can be seen that forces which occur during assembly, for example, during attachment of a cable, and that act upon the upper connection part are not transferred to the lower connection part.

In the FIGS. 2 and 3 only one power terminal is represented. It is understood that the connections according to FIG. 1 can provided correspondingly.

Figure 4:
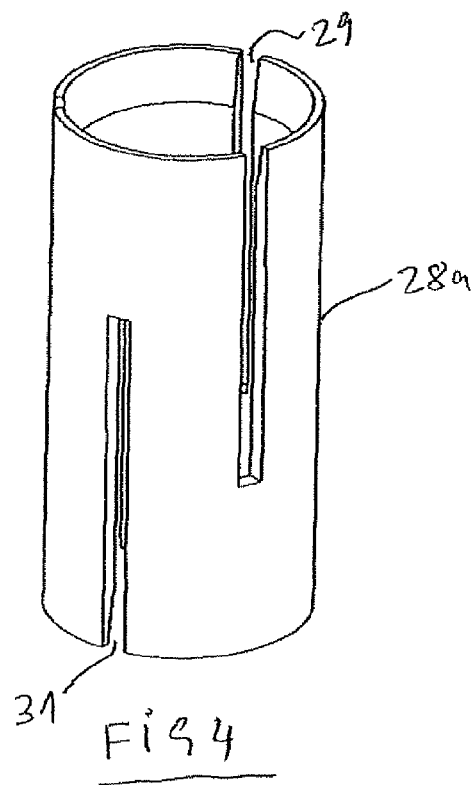
FIG. 4 shows in perspective a sleeve that can be used, for example, for a design according to FIG. 3.

In FIG. 4, a sleeve 28a is represented that is circular cylindrical, and has, starting from the ends, three slits 29 and 31 that are axially parallel, uniformly distributed in the circumferential direction. The slits 29, 31 are disposed offset to each other. Their length amounts to, for example, ⅔ of the entire length of the sleeve 28a. The sleeve can be used, for example, for contact sections as represented in FIG. 2 or also FIG. 3. There they are spherical or barrel shaped. The inner diameter of the sleeve 28a is somewhat smaller than the outer diameter of the contact sections 126, 130 or 22 or 24.

Figure 5:
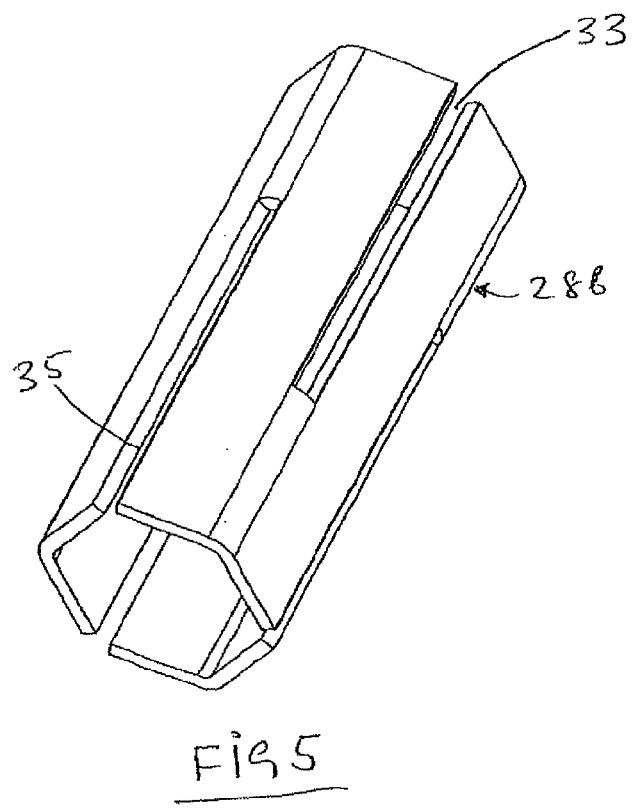
FIG. 5 shows in perspective a further possibility of a sleeve that can be used in connection with the embodiment according to FIG. 3.

In FIG. 5 a sleeve 28b is represented that has a hexagonal cross-section. In the corner regions it is provided with slits 33 and 35 that each extend in the wall of the sleeve 28b axially parallel from the ends, wherein the slits 33, 35 lie offset to each other in the circumferential direction. Their length similarly amounts to, for example, ⅔ of the entire length of the sleeve 28a.

It is also conceivable to form axially parallel slits in the sleeves 28a, 28b that lie directly opposite each other and are aligned to each other. Naturally, in this case their length must be less than half the length of the sleeve. Therefore it preferably amounts to ⅜ of the entire length of the sleeve. In the most recently described embodiment, the thickness of the wall of the sleeve is preferably greater in the central region than at the ends.

The connection part shown in FIGS. 6, 7, and 8, replaces, for example, the connection part 16 or 116 according to FIGS. 2 and 3. It is labeled 216. A connection section 222 has a hexagonal shape that, such as the cylindrical section 26 in FIG. 3, can be injection molded with the housing wall. A cylindrical section 223 connects to this. A contact section 226 is formed as a double cone, wherein the common base plane forms the area of the larger outer diameter of the double cone. A rounded transition, labeled 231, is formed between the conical casing surfaces 227 and 229. The conical angle is relatively small and amounts, for example to 5° to 10°. The outer diameter of the double cone 226 in the area of the transition 231 is somewhat larger than the inner diameter of a sleeve, as described above or as described in the following.

Similar to that in FIG. 2, the connection part 216 has a threaded bore 224, for example for a connection to a cable lug using a screw, not shown.

In FIG. 8, the connection part 218 for the embodiment according the FIGS. 6 and 7 is also shown. It has a flange-like connection section 228 and also a contact section 230 in the form of a double cone corresponding to the double cone of the contact section 226 according to the FIGS. 7 and 8.

In the FIGS. 6 and 9 to 11, a sleeve is shown that can be deployed advantageously, in particular, as the sleeve in connection with the embodiment according to FIGS. 6 and 7. The sleeve is commonly designated 328. It is formed by two sleeve sections 330 and 332 (FIG. 10), which are separated from each other by a transverse wall 334. The transverse wall has a conical depression on opposite sides. An outer annular groove 336, 338 that is semi-circular in cross-section belongs to each sleeve section 330, 332, and due to said groove the wall of the sleeve section 330, 332 is weakened. This wall has a series of axially parallel slits 340 that are distanced in the circumferential direction and that extend up to the cross wall 334. Furthermore, the sleeve sections have annular receiving grooves 342 near the free ends, for receiving a slit annular spring 344, composed of flat material. The annular springs 344 reinforce the clamping engagement, for example, with the double cones of the receiving section 226, 230 of the connection parts according to FIG. 8.

FIG. 10 shows the sleeve 328 without the springs 344. It is understood that the sleeve, too, is composed of a suitable electrically conducting material, and has a sufficient elasticity for the clamping engagement with the double cones of the connecting sections 216 and 218 according to FIG. 8. For improved sliding of the sleeve 328 onto the connection part, the sleeve sections 330 and 332 have conical entry sections 350.

The power terminal according to FIGS. 12 and 13 has the same connection parts as the power terminal according to FIGS. 6 and 7. However, a modified sleeve 428 is provided that is essentially cylindrical inside and outside. Axially parallel slits 440 that are disposed uniformly about the circumference, extend from both ends of the sleeve 428 to beyond the center of the sleeve. Additionally, the axially parallel slits 440 are displaced to each other so that they overlap each other in the central region of the sleeve 428. Here too, the sleeve is composed of a material that is a good electrical conductor. Other than that, the function of the sleeve 428 is the same as that of the sleeve 328 according to the FIGS. 6 to 11. The assembly to the connection parts, as well, is the same as that for the embodiment according to the FIGS. 6 and 7. As can be seen, the thickness of the wall of the sleeve 428 is somewhat greater than the thickness of the wall of sleeve 328 according to the FIGS. 6 and 7 or 9 and 10. However, the axially parallel slits 440 supply a sufficient elasticity. An annular spring, as is used in the embodiment according to FIGS. 6 and 7, can be omitted in this embodiment.

It is noted that the length of the axially parallel slits 440 amounts to approximately ⅔ of the entire length of the sleeve 428. In the embodiment according to the FIGS. 6, 7, 9 and 10, the length of the slits 328 amounts to approximately ⅜ of the entire length of the sleeve 328.

This completes the description of the preferred and alternate embodiments of the invention. Those skilled in the art may recognize other equivalents to the specific embodiment described herein which equivalents are intended to be encompasses by the claims attached hereto.

What is claimed is:

1. A power element for a motor of an industrial truck having a housing, in the housing at least one circuit board, which has power terminals for a power supply line, which are led through a wall of the housing and bonded to the circuit board, wherein the power terminals have a first connection part (16, 116) led through the wall (10, 108) with a first contact section (24, 126) lying within the housing, a second contact part (118) in contact with the circuit board (14, 110) and with a second contact section (22, 130), which is aligned to the first contact section (24, 126) and is distanced from it, and a radially elastic sleeve (28, 120), composed of conducting material, that surrounds the two contact sections (22, 130, 24, 126) in a clamping manner, wherein the outer contour of the contact sections (22, 130, 24, 126) and the sleeve (28, 120) are formed such that a mechanical contact of the contact sections (22, 130, 24, 126) to the sleeve (28, 120) is maintained even with a misalignment of the contact sections (22, 24) to each other, wherein the sleeve has one or more slits (30) that permit a radial expansion of the sleeve (28).

2. The power element according to claim 1, wherein the outer contour of at least one contact section (22, 24) is barrel shaped.

3. The power element according to claim 1, wherein at least one contact section is formed by a double cone (226, 230) with common base plane, wherein the casing surfaces have a rounded transition (231).

4. The power element according to claim 1, wherein the sleeve has an inner cross-section that is cylindrical or polygonal.

5. The power element according to claim 1, wherein the sleeve (28) is one-piece.

6. The power element according to claim 1, wherein a sleeve is composed of several parts.

7. The power element according to claim 1, wherein the housing wall (10) is formed from plastic, and is injected molded to the first connection part or the hexagonal section.

8. The power element according to claim 1, wherein the second connection section (22) is connected to a disc shaped section (20) for the purpose of contacting the circuit board (14), and that the second contact section (22) is connected as one-piece to the disc shaped section (20).

9. A power element for a motor of an industrial truck having a housing, in the housing at least one circuit board, which has power terminals for a power supply line, which are led through a wall of the housing and bonded to the circuit board, wherein the power terminals have a first connection part (16, 116) led through the wall (10, 108) with a first contact section (24, 126) lying within the housing, a second contact part (118) in contact with the circuit board (14, 110) and with a second contact section (22, 130), which is aligned to the first contact section (24, 126) and is distanced from it, and a radially elastic sleeve (28, 120), composed of conducting material, that surrounds the two contact sections (22, 130, 24, 126) in a clamping manner, wherein the outer contour of the contact sections (22, 130, 24, 126) and the sleeve (28, 120) are formed such that a mechanical contact of the contact sections (22, 130, 24, 126) to the sleeve (28, 120) is maintained even with a misalignment of the contact sections (22, 24) to each other, wherein a sleeve (28) is slit in the longitudinal direction.

10. The power element according to claim 9, wherein the sleeve (328) between the ends is separated by a cross wall (334), and the axially parallel slits (340) extend approximately up to the cross wall (334).

11. The power element according to claim 10, wherein the wall of the sleeve (328) is weakened by annular grooves (336, 338) on both sides of the cross wall (34).

12. The power element according to claim 9, wherein the annular sleeve (328) near the free ends has an outer annular shaped receiving groove (342) that receives an annular spring (344).

13. The power element according to claim 9, wherein the sleeve (28a, 28b) has a smaller inner diameter than the maximum outer diameter of the conical shaped, barrel shaped, or double cone contact section (22, 24, 126, 130) and the sleeve (28a, 28b), starting from its ends, has axially parallel slits (29, 39, 31) or (33, 35) that are uniformly distanced in the circumferential direction.

14. The power element according to claim 13, wherein the slits assigned to the one of the ends of the sleeve are offset in the circumferential direction relative to the opposite lying slits (FIG. 5).

15. The power element according to claim 13, wherein the length of the slits (29, 31) or (33, 35) amounts to approximately ⅔ of the entire length of the sleeve (28a, 28b).

16. The power element according to claim 13, wherein the slits (30) assigned to the ends of the sleeve (28) are aligned to each other.

17. The power element according to claim 16, wherein the length of the slits (30) amounts to approximately ⅜ of the entire length of the sleeve (28).

18. A power element for a motor of an industrial truck having a housing, in the housing at least one circuit board, which has power terminals for a power supply line, which are led through a wall of the housing and bonded to the circuit board, wherein the power terminals have a first connection part (16, 116) led through the wall (10, 108) with a first contact section (24, 126) lying within the housing, a second contact part (118) in contact with the circuit board (14, 110) and with a second contact section (22, 130), which is aligned to the first contact section (24, 126) and is distanced from it, and a radially elastic sleeve (28, 120), composed of conducting material, that surrounds the two contact sections (22, 130, 24, 126) in a clamping manner, wherein the outer contour of the contact sections (22, 130, 24, 126) and the sleeve (28, 120) are formed such that a mechanical contact of the contact sections (22, 130, 24, 126) to the sleeve (28, 120) is maintained even with a misalignment of the contact sections (22, 24) to each other, wherein the first connection part (16) has a connection section (26) that is fixed in the housing wall (10) and extends beyond this outwards.

19. The power element according to claim 18, wherein the connection section (26) is cylindrically shaped.

20. The power element according to claim 18, wherein the connection section has a polygonal, preferably hexagonal section (222).

21. The power element according to claim 18, wherein the contact section (24) and the connection section (26) are formed as one-piece.

* * * * *